United States Patent
Halladay et al.

(10) Patent No.: US 6,752,389 B2
(45) Date of Patent: Jun. 22, 2004

(54) MOUNT HAVING INTEGRATED DAMPER AND LOAD CARRYING SPRING

(75) Inventors: James R. Halladay, Harborcreek, PA (US); Wallace C. Flower, Erie, PA (US); Roger Cook, Okemos, MI (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/020,356

(22) Filed: Oct. 30, 2001

(65) Prior Publication Data

US 2003/0205855 A1 Nov. 6, 2003

(51) Int. Cl.$^7$ .................................................. F16F 1/00
(52) U.S. Cl. ................................. 267/140.12; 267/134
(58) Field of Search ............................. 267/134, 201, 267/202, 140.12

(56) References Cited

U.S. PATENT DOCUMENTS

| | | | | |
|---|---|---|---|---|
| 1,998,206 A | * | 4/1935 | Rosenzweig | 248/621 |
| 2,464,613 A | * | 3/1949 | Rosenzweig | 248/614 |
| 2,717,747 A | * | 9/1955 | Rosenzweig | 267/201 |
| 2,906,523 A | * | 9/1959 | Painter | 267/134 |
| 4,391,436 A | | 7/1983 | Fishbaugh | 267/141.1 |
| 4,515,234 A | | 5/1985 | Loy et al. | 180/89.12 |
| 4,842,258 A | | 6/1989 | Misaka et al. | |
| 4,957,279 A | * | 9/1990 | Thorn | 267/140.5 |
| 5,121,905 A | | 6/1992 | Mann et al. | |
| 5,183,137 A | | 2/1993 | Siwek et al. | 188/381 |
| 5,257,680 A | * | 11/1993 | Corcoran et al. | 267/134 |
| 5,284,315 A | | 2/1994 | Hofmann et al. | 248/562 |
| 5,295,671 A | | 3/1994 | Nakagaki et al. | 267/140.13 |
| 5,308,048 A | | 5/1994 | Weaver et al. | 267/220 |
| 5,323,885 A | | 6/1994 | Fukunaga et al. | 188/381 |
| 5,486,056 A | | 1/1996 | Thorn | 403/322 |
| 5,503,940 A | * | 4/1996 | Majumdar et al. | 428/492 |
| 5,549,182 A | * | 8/1996 | Ehrnsberger et al. | 267/202 |
| 5,579,860 A | | 12/1996 | Halverson et al. | 180/89.14 |
| 5,636,826 A | | 6/1997 | Nakagaki et al. | 248/562 |
| 5,641,153 A | | 6/1997 | Gwinn | 267/294 |
| 5,720,369 A | * | 2/1998 | Thorn | 267/202 |
| 5,725,066 A | * | 3/1998 | Beard et al. | 180/89.12 |
| 5,820,115 A | | 10/1998 | Stevenson et al. | 267/293 |
| 5,873,565 A | | 2/1999 | Allaire | 267/292 |
| 5,975,972 A | | 11/1999 | Wilmsen | 440/111 |
| 5,979,884 A | | 11/1999 | Sato et al. | 267/140.13 |
| 5,988,610 A | | 11/1999 | Hiraki et al. | 267/140.13 |
| 6,050,554 A | | 4/2000 | Tourneir | 167/140.11 |
| 6,050,555 A | | 4/2000 | Gärtner et al. | 267/141 |
| 6,250,615 B1 | | 6/2001 | Leibach | |

FOREIGN PATENT DOCUMENTS

| | | |
|---|---|---|
| EP | 0 481 144 A1 | 4/1992 |
| EP | 0 840 032 A2 | 5/1998 |
| EP | 0 953 788 A2 | 11/1999 |
| JP | 09-014333 | 1/1997 |

OTHER PUBLICATIONS

Lord Mechanical Products for Industrial Applications, *Engineering Guide and Catalog for Vibration, Shock and Noise Control Products*, PC2201o, p. 47—Hystec™ Mounts, Sep. 1998—14M.

* cited by examiner

Primary Examiner—Robert Siconolfi
(74) Attorney, Agent, or Firm—Edward F. Murphy, III

(57) ABSTRACT

A mount comprising a unitary resilient member where the unitary resilient member comprises a spring portion, an intermediate stiffening portion and a damping layer, and the resilient member is compressible and extendible. The resilient member is substantially enclosed by a casing. The mount further includes damping means located in contact with said damping layer, the damping means providing damping in response to compression and extension of said resilient member.

4 Claims, 3 Drawing Sheets

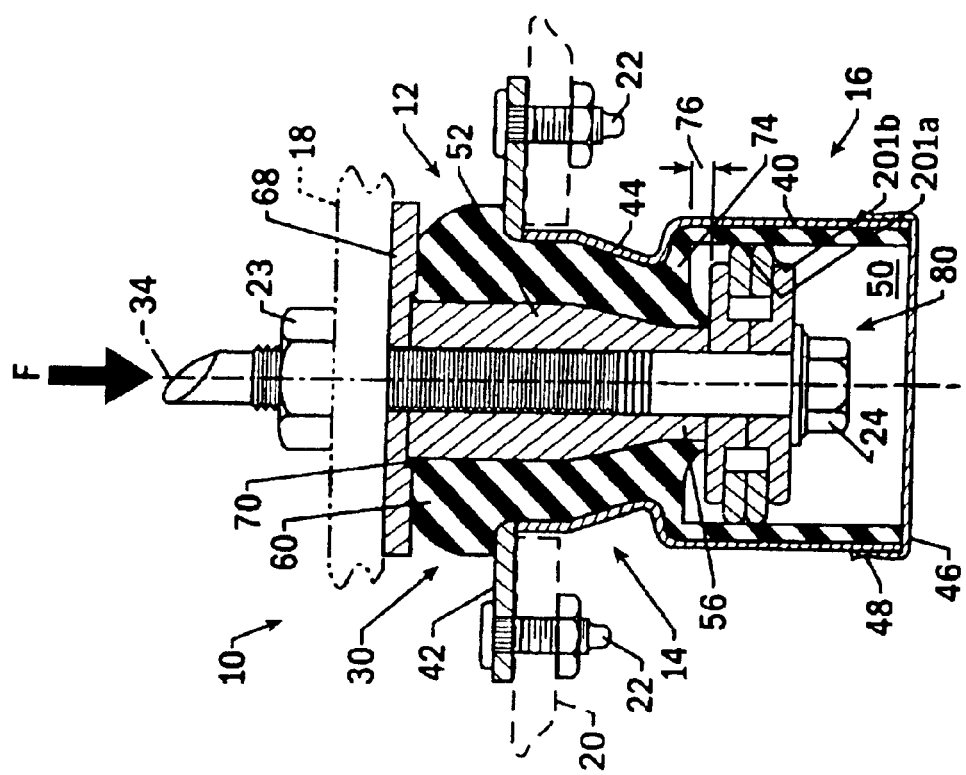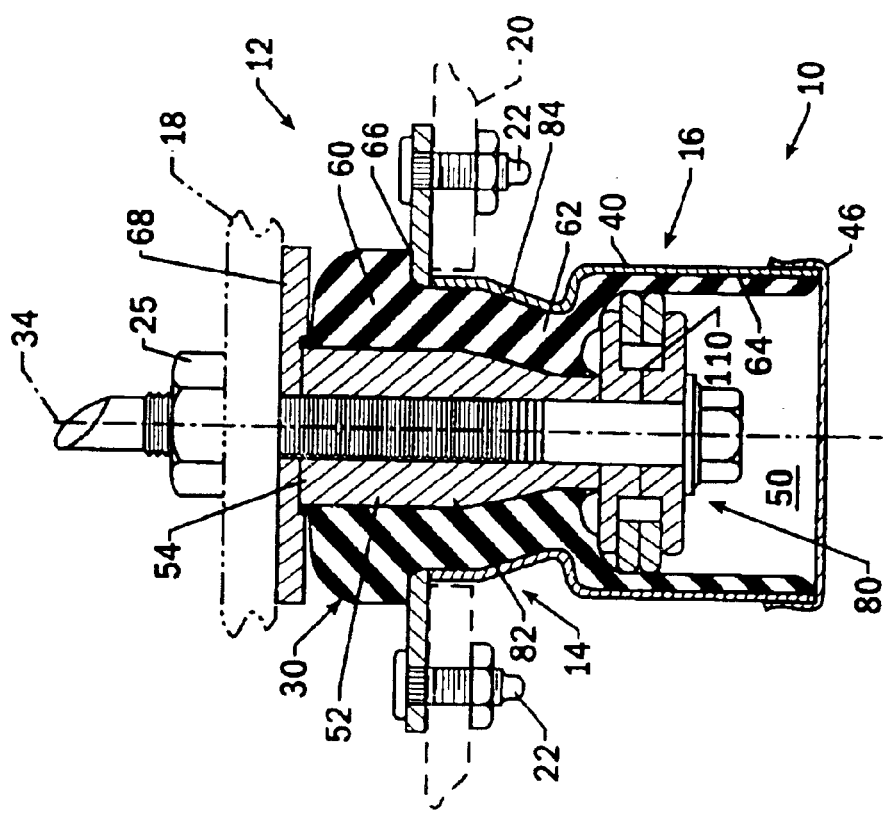

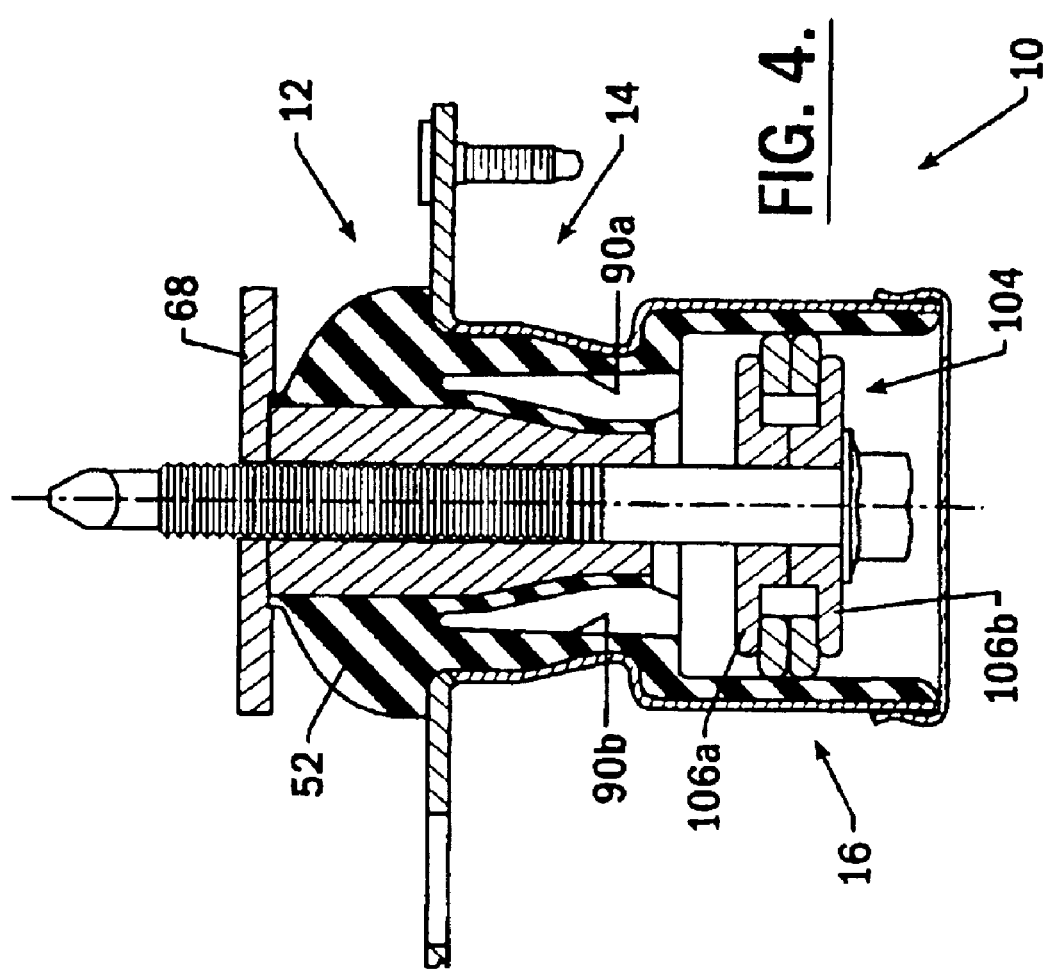

MOUNT HAVING INTEGRATED DAMPER AND LOAD CARRYING SPRING

FIELD OF THE INVENTION

The invention relates to a mount for limiting the transmission of vibratory disturbances, and more specifically the invention relates to a mount wherein the mount includes a unitary member that serves as a load carrying spring and damper.

BACKGROUND OF THE INVENTION

Generally, mounts or isolation devices are used to limit the transmission of vibratory disturbances from a first vibrating structure to a second supported structure.

It is desirable for such mounts to provide effective damping over large deflections and over a wide range of frequencies. One way that prior art mounts accommodate such a range of loads and deflections is by including a discrete load carrying spring member in combination with a discrete damper. Such prior art mounts that provide a spring and damper and are modular in design and assembly. The discrete load carrying spring is made from a highly resilient elastomer such as natural rubber and the discrete damper is made from a material that experiences high hysteresis or is lossy and such material may comprise polybutadiene. When assembled the discrete damper and spring are aligned along a working axis. The spring and damper are typically comprised of a large number of discrete component parts that must be assembled precisely and with the proper axial alignment. Due to the large number of component parts and because of the precise alignment required to manufacture and assemble such prior art mounts, the mounts are difficult and expensive to manufacture and assemble.

The foregoing illustrates a limitation known to exist in present mounts. Thus, it is apparent that it would be advantageous to provide an alternative directed to overcoming the limitation set forth above. Accordingly, a suitable alternative mount is provided including features more fully disclosed hereinafter.

SUMMARY OF THE INVENTION

In one aspect of the present invention this is accomplished generally by providing a mount with a unitary member that serves both as a load carrying spring and provides damping. More specifically the mount of the present invention comprises a unitary resilient member, where said unitary resilient member comprises a spring portion, a damping layer and an intermediate stiffening portion joining the spring portion and damping layer, said resilient member being compressible and extendible. The mount also comprises a casing substantially enclosing said unitary resilient member; and damping force means located in contact with said damping layer, the damping means providing damping in response to compression and extension of said resilient member.

The unitary resilient member is made from a material selected from the group of materials consisting of natural rubber, polybutadiene, polyisoprene and styrene butadiene. Alternatively the unitary resilient member may be comprised of a combination of materials selected from the group of materials consisting of polybutadiene, polyisoprene and styrene butadiene. The base material is reinforced with a carbon black and is cured with sulfur and/or peroxide. Additionally, the unitary resilient member includes an internal lubricant. The lubricant may be comprised of either octadecanoic acid or 9-octadecenamide for example.

The foregoing and other aspects will become apparent from the following detailed description of the invention when considered in conjunction with the accompanying drawing figures.

BRIEF DESCRIPTION OF THE DRAWINGS

FIG. 3A is a longitudinal sectional view taken along line 3—3 of FIG. 2 showing the mount unloaded.

FIG. 3B is a longitudinal sectional view taken along line 3—3 of FIG. 2 showing the mount loaded.

FIG. 4 is a longitudinal sectional view taken along line 4—4 of FIG. 2.

DETAILED DESCRIPTION OF THE PREFERRED EMBODIMENTS

Figure 1:
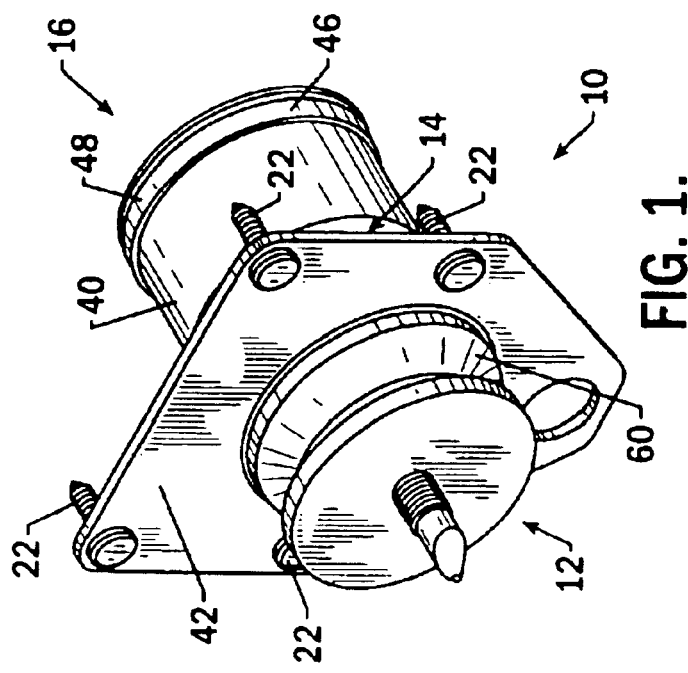
FIG. 1 is an isometric view of the mount of the present invention.

Now turning to the drawing figures wherein like parts are referred to by the same numbers in the several views, FIG. 1 illustrates mount 10 of the present invention having a load carrying spring 12, a damping portion 16 and an intermediate portion 14 joining the spring and damping portion. In use, the mount 10 is located between a first member or supported member 18 and a second member or supporting member 20. The mount serves to effectively limit the transmission of vibratory disturbances from the supporting member to the supporting member 18. Members 18 and 20 do not form a part of the present invention and are therefore represented in dashed font in FIGS. 3A and 3B. Members 18 and 20 are not illustrated in FIG. 4. According to an exemplary use for the mount 10 of the present invention the mount may be located between a first member comprised of truck cab and a supporting member comprised of a support structure on a vehicle frame. As shown in FIGS. 3A and 3B, the mount is attached to second member 20 by a plurality of conventional fasteners 22 which may be bolts for example. The first member 18 is coupled to the mount by nut 23 and bolt 24 connection that extends axially through the mount and along mount displacement axis 34. The bolt connection 24 will be described in greater detail hereinafter. The mount is active along axis 34 and it is preferred that the mount be oriented substantially vertically relative to the supported and supporting members 18 and 20 and in the manner gererally shown in FIGS. 3A, 3B and 4.

Referring to FIGS. 3A and 3B, mount 10 comprises a unitary resilient member 30 that is partially enclosed by rigid casing 40, 44. The elastomer that comprises unitary resilient member 30 includes a base elastomer that may be comprised of a natural rubber or a rubber blend where the most preferred blends are comprised of polybutadiene, polyisoprene, styrene butadiene, hydrogenated nitrile or any combination blend thereof. It is preferred that the base rubber or blend be reinforced with a low to moderate amount of carbon black and such amount may be in the range of 0.5 to 5 phr. (The abbreviation "phr" means parts by weight of the added material per hundred parts by weight of rubber) The reinforced material is then cured with sulfur and/or peroxide, and also the elastomer also includes an internal lubricant (1 to 20 phr) consisting of either octadecanoic acid sold as "Paricin 1" by Cashem, Inc., 9-octadecenamide sold as "Armoslip CP" by Akzo-Nobel Chemicals or any suitable lubricant that is chemically similar to either octadecanoic acid or 9-octadecenamide and is capable of bleeding to the elastomer material surface to form a dry but slippery film. The preferred level is four to eight phr. In summary, the preferred materials generally have characteristics and compositions that provide a suitable unitary resilient member 30 that provides spring loading and damping as a result of the material formulation comprising the unitary member. The suitable materials generally comprise effective friction, wear and hysteriesis properties for providing surface effect damping and also low creep under static and dynamic loading for the load carrying spring. As a result of the unitary member 30, discrete spring and damping devices are not required.

The casing is unitary and generally comprises hollow cylindrical portion 40, attachment plate 42 and intermediate portion 44 joining the plate and cylindrical portion. The attachment plate 42 is fixed to the supporting member 20 by fasteners 22 as shown in FIGS. 3A and 3B. During the molding process, the unitary elastomer member 30 is bonded to the intermediate casing member 44 and attachment plate 42, and to rigid inner member 52 using a conventional manufacturing process well known to one skilled in the art and such molding process may comprise a transfer molding process for example. One end of the lower portion 40 is closed by a cap 46 that is maintained at the end of portion 40 by shrink fit retention means 48 that extends annularly proximate the free cap end. The cap and cylindrical portion define a damping chamber 50.

Referring to FIGS. 3A and 3B, the unitary resilient member 30 comprises a load carrying spring 60, intermediate stiffening section 62, and damping layer 64 where the intermediate stiffening section 62 joins the load carrying spring and damping layer. As illustrated in FIGS. 3A, 3B and 4, the spring is located at a first end of inner member 52 and between attachment plate 42 and snubbing plate 68 which in turn supports the supported member 18. As assembled the plate 68 is removably seated on the end 54 of inner member 52. The spring member 60 is annular and a portion of the outer periphery 66 of the spring member 60 is seated on and bonded to the attachment plate. A conventional stress relief 70 is provided along the portion of the spring proximate inner member end 54, and the stress relief serves to limit the stresses imparted on the spring 60 during the repetitive compression cycles that the spring experiences as a result of vibratory excitation of the mount.

Contrasting FIGS. 3A and 3B, FIG. 3A shows unloaded mount 10 and FIG. 3B illustrates the compression of spring 60 in response to the application of force F to the mount. The spring member is compressed and such compression is limited by snubbing that occurs between the spring and plate 68 when the spring is compressed a predetermined maximum amount. In FIG. 3B the snubbing plate is located proximate the snubbing location against the spring. In FIG. 3A the spring is returned to its uncompressed position and the plate 68 is located away from the spring. The snubbing clearance is defined as the distance between the plate 68 and attachment plate 42.

The intermediate stiffening section 62 is substantially conical and joins the spring 60 and damping layer 64. As shown in FIGS. 3A, 3B and 4 the intermediate stiffening section terminates proximate the second end 56 of inner member 52. The damping layer 64 and intermediate section 62 are joined by a laterally extending, flexible web 74. The web flexes in response to axial displacement of the inner member 52. As shown in FIG. 3A the web snubs the displacement of damping head 80 as the head contacts the web. As the damping head is displaced axially away from web 74, the web flexes as the inner member is drawn axially downwardly. The axial displacement of damping member 80 is identified at 76 in FIG. 3B.

The inner member includes annularly extending elbow or transition 82 where the outer dimension of the inner member is changed. Extending axially from the first end 54 to the second end 56, the radial dimension of the inner member is reduced at the transition 82. Additionally, the casing includes a similar annular transition 84 and extending axially from plate 42 to housing 40 the radial dimension of the casing 44 is decreased at the transition 84. The axial stiffness of the mount in compression is increased by the inclusion of the transitions in the casing and inner member. The intermediate portion 62 is compressed between inner member 52 and casing portion 44 as the mount is axially displaced and compressed as shown in FIG. 3B.

Figure 2:
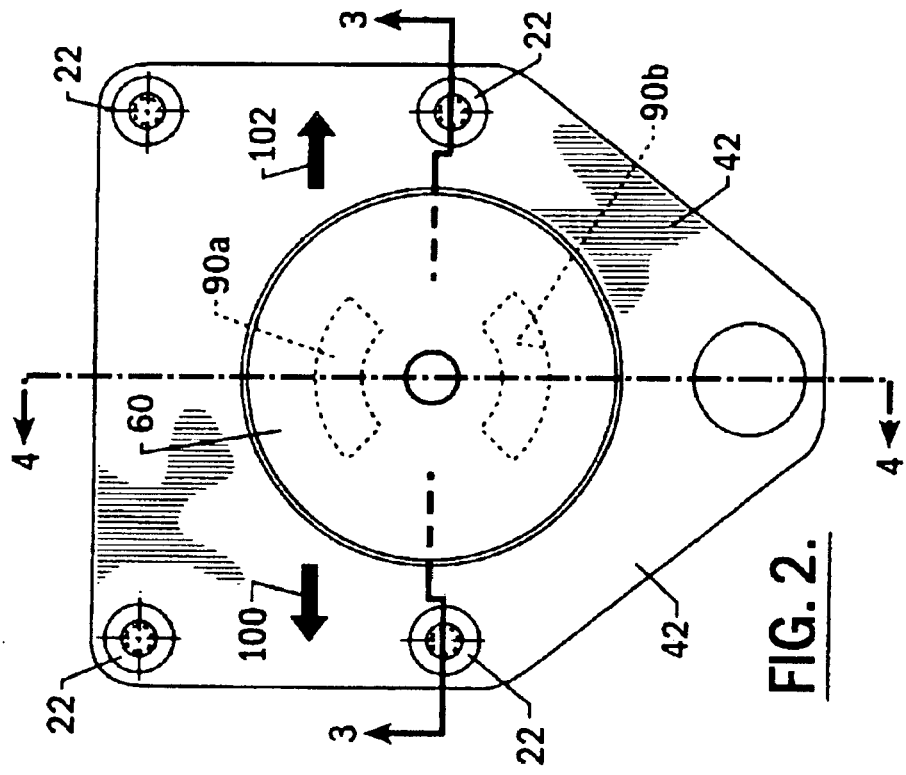
FIG. 2 is a top plan view of the mount of FIG. 1.

As shown in FIGS. 2 and 4 the intermediate stiffening portion 62 includes cavities 90a and 90b. As shown in FIG. 2, the mount 10 of the present invention is oriented in the manner shown in FIG. 2 with fore and aft directions identified by arrows 100 and 102. The cavities are offset by about 180 degrees and are 90 degrees offset from the fore and aft directions. As a result, the mount 10 has a greater stiffness in the fore and aft direction than it does in the lateral direction ninety degrees (90°) offset from the fore and aft direction that include the cavities 90a and 90b.

Surface effect damping is provided by damping portion 16. Damping layer 64 is bonded to the housing 40 during molding of the member 30 as described above. A damping head or piston 80 is located in chamber 50 and is comprised of a collar 104 having upper and lower halves 106a and 106b. At least one disk 108 is clamped in place between halves 106a and 106b and the disk is most preferably made from nylon. The disk includes a pair of annular contact portions 201a and 201b with arcuate cross sections and the outer peripheries of each of the contact portions are in contact with the damping layer. As shown in FIGS. 3A, 3B and 4, one discrete disk member is disclosed however any suitable number of disks made from any suitable material may be used to supply the desired damping forces. As the piston head is displaced along axis 34 through chamber 50, the peripheral portions of the disk engage the damping layer 64 to produced surface effect damping forces which in combination with spring and intermediate section 62 serve to limit transmission of vibration between plates 18 and 20. The terms "surface effect" and "surface effect damping" and "surface effect damper" as used in this application comprise damping that is a combination of friction, viscous and hysteretic damping resulting from the relative motion of two surfaces. The relative motion can be sliding or rolling motion for example.

A bolt 24 extends axially along axis 34 through the collar 104, inner member 52, plate 68 and supported member 18 and is fastened by nut that is threadably secured along the bolt and against the plate 68. The member 18, plate 68, inner member 52, and collar are clamped between the bolt head and nut 23. In this way, when the mount experiences vibratory disturbances, the plate 68, inner member and collar move as a single unit. Surface effect damping is provided as the damping peripheries of the damping element engages the damping layer as it is moved relative to the layer. The magnitude of the surface effect damping provided can be changed by adding or removing damping elements or changing the material comprising the damping element. The damping element may be easily replaced by removing the bolt 23 and collar halve 106b. In FIG. 4, the mount is illustrated before being clamped together by bolt 24.

Means for decoupling the collar 104 and damping element 108 is provided in damping portion 16. As assembled, the axial dimension of space 110 for seating the damping element 108 defined by halves 106*a*, 106*b* is nominally greater than the total axial dimension of the element 108. In this way, the collar may be advanced axially a small distance equal to the difference in the axial dimensions between the space and elements before engaging the elements for movement axially with the collar. In this way, damping may be decoupled at a desired location, typically at the ends of travel of the damper 104.

In summary, the mount of the present invention uses a unitary resilient member to effectively provide load carrying spring and surface effect damping to thereby permit the mount to effectively limit the transmission of vibratory disturbances between members 20 and 18. The mount of the present invention effectively dampens vibration over a large range of frequencies and loads. Discrete spring and damping assemblies are eliminated by the mount of the present invention and as a result, the manufacturing and assembly processes associated with the mount are simplified over prior art methods.

While we have illustrated and described a preferred embodiment of our invention, it is understood that this is capable of modification and therefore we do not wish to be limited to the precise details set forth, but desire to avail ourselves of such changes and alterations as fall within the purview of the following claims.

We claim:

1. A mount comprising:
   a unitary resilient member, said unitary resilient member comprising a base elastomer with an internal lubricant, said internal lubricant base elastomer unitary resilient member having a spring portion, a surface effect damping layer with a elastomer material surface, said internal lubricant bleeding to said elastomer material surface to form a dry slippery film on said elastomer material surface, and an intermediate stiffening portion joining the spring portion and said surface effect damping layer, said resilient member being compressible and extendible;
   a casing substantially enclosing said unitary resilient member; and
   a surface effect damping piston head, said surface effect damping piston head located in contact with said surface effect damping layer elastomer material surface, said surface effect damping piston head and said surface effect damping layer elastomer material surface providing a surface effect damping in response to compression and extension of said resilient member and
   said internal lubricant is comprised of an octadecanoic acid.

2. A mount comprising:
   a unitary resilient member, said unitary resilient member comprising a base elastomer with an internal lubricant, said internal lubricant base elastomer unitary resilient member having a spring portion, a surface effect damping layer with a elastomer material surface, said internal lubricant bleeding to said elastomer material surface to form a dry slippery film on said elastomer material surface, and an intermediate stiffening portion joining the some portion and said surface effect damping layer, said resilient member being compressible and extendible;
   a casing substantially enclosing said unitary resilient member; and
   a surface effect damping piston head, said surface effect damping piston head located in contact with said surface effect damping layer elastomer material surface, said surface effect damping piston head and said surface effect damping layer elastomer material surface providing a surface effect damping in response to compression and extension of said resilient member and the internal lubricant is comprised of a 9-octadecenamide.

3. A mount comprising:
   a unitary resilient member, said unitary resilient member comprising a base elastomer with an internal lubricant, said internal lubricant base elastomer unitary resilient member having a spring portion, a surface effect damping layer with a elastomer material surface, said internal lubricant bleeding to said elastomer material surface to form a dry slippery film on said elastomer material surface, and an intermediate stiffening portion joining the spring portion and said surface effect damping layer, said resilient member being compressible and extendible;
   a casing substantially enclosing said unitary resilient member; and
   a surface effect damping piston head, said surface effect damping piston head located in contact with said surface effect damping layer elastomer material surface, said surface effect damping piston head and said surface effect damping layer elastomer material surface providing a surface effect damping in response to compression and extension of said resilient member and said base elastomer with said internal lubricant is comprised of 1 to 20 phr of said internal lubricant.

4. A mount comprising:
   a unitary resilient member, said unitary resilient member comprising a base elastomer with an internal lubricant, said internal lubricant base elastomer unitary resilient member having a spring portion, a surface effect damping layer with a elastomer material surface, said internal lubricant bleeding to said elastomer material surface to form a dry slippery film on said elastomer material surface, and an intermediate stiffening portion joining the spring portion and said surface effect damping layer, said resilient member being compressible and extendible;
   a casing substantially enclosing said unitary resilient member; and
   a surface effect damping piston head, said surface effect damping piston head located in contact with said surface effect damping layer elastomer material surface, said surface effect damping piston head and said surface effect damping layer elastomer material surface providing a surface effect damping in response to compression and extension of said resilient member and said base elastomer is comprised of a natural rubber reinforced with a carbon black in an amount in the range of 0.5 to 5 phr.

\* \* \* \* \*